(12) United States Patent
Philipp et al.

(10) Patent No.: US 12,146,956 B2
(45) Date of Patent: Nov. 19, 2024

(54) POLARIZATION DIVERSITY DETECTION IN FMCW LIDAR

(71) Applicant: GM GLOBAL TECHNOLOGY OPERATIONS LLC, Detroit, MI (US)

(72) Inventors: Tzvi Philipp, Bet Shemesh (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 996 days.

(21) Appl. No.: 17/135,405

(22) Filed: Dec. 28, 2020

(65) Prior Publication Data

US 2022/0206148 A1 Jun. 30, 2022

(51) Int. Cl.
*G01S 17/34* (2020.01)
*G01S 7/481* (2006.01)
*G01S 7/4914* (2020.01)
*G01S 7/499* (2006.01)

(52) U.S. Cl.
CPC .......... *G01S 17/34* (2020.01); *G01S 7/4813* (2013.01); *G01S 7/4817* (2013.01); *G01S 7/4914* (2013.01); *G01S 7/499* (2013.01)

(58) Field of Classification Search
CPC ...... G01S 17/34; G01S 7/4813; G01S 7/4817; G01S 7/4914; G01S 7/499
See application file for complete search history.

(56) References Cited

U.S. PATENT DOCUMENTS

| | | | | |
|---|---|---|---|---|
| 2011/0228249 A1* | 9/2011 | Koehler | ............... | G02B 27/283 356/4.01 |
| 2018/0011174 A1* | 1/2018 | Miles | ...................... | G01S 17/10 |
| 2020/0275078 A1* | 8/2020 | Pau | ......................... | H04N 23/56 |
| 2020/0333440 A1* | 10/2020 | Negoita | ................. | G01S 7/4811 |
| 2021/0247505 A1* | 8/2021 | Sarma | ................... | G01S 7/4802 |
| 2021/0405155 A1* | 12/2021 | Shand | ..................... | G01S 17/42 |

* cited by examiner

*Primary Examiner* — Luke D Ratcliffe
*Assistant Examiner* — Joseph C Fritchman
(74) *Attorney, Agent, or Firm* — CANTOR COLBURN LLP

(57) ABSTRACT

A system and method of classifying an object. The system includes a polarizing beam splitter, a first detector, a second detector and a processor. The polarizing beam splitter generates a first source signal having a first polarization direction and a second source signal having a second polarization. The first detector transmits the first source signal at the object and receives a first reflected signal generated at the object in response to the first source signal. The second detector transmits the second source signal at the object and receives a second reflected signal generated at the object in response to the second source signal. The processor is configured to compare the first reflected signal to the second reflected signal to classify the object.

20 Claims, 3 Drawing Sheets

POLARIZATION DIVERSITY DETECTION IN FMCW LIDAR

INTRODUCTION

The subject disclosure relates to sensor systems and, in particular, to a system and method for classifying an object based on a polarization of a signal reflected from the object.

An autonomous vehicle can employ a sensor in order to locate an object in its environment. For example, a light-based sensor on the autonomous vehicle, such as Lidar, can be used to transmit a light from the vehicle. The light is reflected from the object and received back at the sensor, where parameters of the reflected light are measured and compared to similar parameters of the transmitted light. Such detection can yield a location and/or range of the object but does not indicated what type of object it is. Accordingly, it is desirable to provide a method for operating a light sensor to determine a classification of the object as well as range and location.

SUMMARY

In one exemplary embodiment, a method of classifying an object is disclosed. A first source signal having a first polarization direction and a second source signal having a second polarization direction are transmitted at the object. A first reflected signal generated at the object in response to the first source signal is received. A second reflected signal generated at the object in response to the second source signal is received. The object is classified by comparing the first reflected signal to the second reflected signal.

In addition to one or more of the features described herein, the method includes classifying the object by comparing a second reflection intensity of the second reflected signal to a first reflection intensity of the first reflected signal. The method further includes generating the first source signal and the second source signal from an elliptically polarized light beam. In an embodiment, the elliptically polarized light beam is a circularly polarized light beam. The method further includes determining a transmission ratio of the first source signal to the second source signal, determining a polarization signal ratio of the first reflected signal to the second reflected signal, and classifying the object based on a difference between the transmission ratio and the polarization signal ratio. In an embodiment the first polarization direction is a P-polarization direction and the second polarization direction is an S-polarization direction. The method further includes adjusting a ratio of the first source signal to the second source signal to select the object for observation based on its classification.

In another exemplary embodiment, a system for classifying an object is disclosed. The system includes a polarizing beam splitter, a first detector, a second detector and a processor. The polarizing beam splitter generates a first source signal having a first polarization direction and a second source signal having a second polarization direction. The first detector transmits the first source signal at the object and receives a first reflected signal generated at the object in response to the first source signal. The second detector transmits the second source signal at the object and receives a second reflected signal generated at the object in response to the second source signal. The processor is configured to compare the first reflected signal to the second reflected signal to classify the object.

In addition to one or more of the features described herein, the processor is further configured to classify the object by comparing a second reflection intensity of the second reflected signal to a first reflection intensity of the first reflected signal. The polarizing beam splitter generates the first source signal and the second source signal from an elliptically polarized light beam. In an embodiment, the elliptically polarized light beam is a circularly polarized light beam. The processor is further configured to determine a transmission ratio of the first source signal to the second source signal, determine a polarization signal ratio of the first reflected signal to the second reflected signal, and classify the object based on a difference between the transmission ratio and the polarization signal ratio. In an embodiment, the first polarization direction is a P-polarization direction and the second polarization direction is an S-polarization direction. The processor is further configured to adjust a ratio of the first source signal to the second source signal to select the object for observation based on its classification.

In yet another exemplary embodiment, a vehicle is disclosed. The vehicle includes a polarizing beam splitter, a first detector, a second detector and a processor. The polarizing beam splitter generates a first source signal having a first polarization direction and a second source signal having a second polarization direction. The first detector transmits the first source signal at the object and receives a first reflected signal from the object in response to the first source signal. The second detector transmits the second source signal at the object and receives a second reflected signal from the object in response to the second source signal. The processor is configured to compare the first reflected signal to the second reflected signal to classify the object.

In addition to one or more of the features described herein, the processor is further configured to classify the object by comparing a second reflection intensity of the second reflected signal to a first reflection intensity of the first reflected signal. The polarizing beam splitter generates the first source signal and the second source signal from an elliptically polarized light beam. The processor is further configured to determine a transmission ratio of the first source signal to the second source signal, determine a polarization signal ratio of the first reflected signal to the second reflected signal, and classify the object based on a difference between the transmission ratio and the polarization signal ratio. In an embodiment, the first polarization direction is a P-polarization direction and the second polarization direction is an S-polarization direction. The processor is further configured to adjust a ratio of the first source signal to the second source signal to select the object for observation based on its classification.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
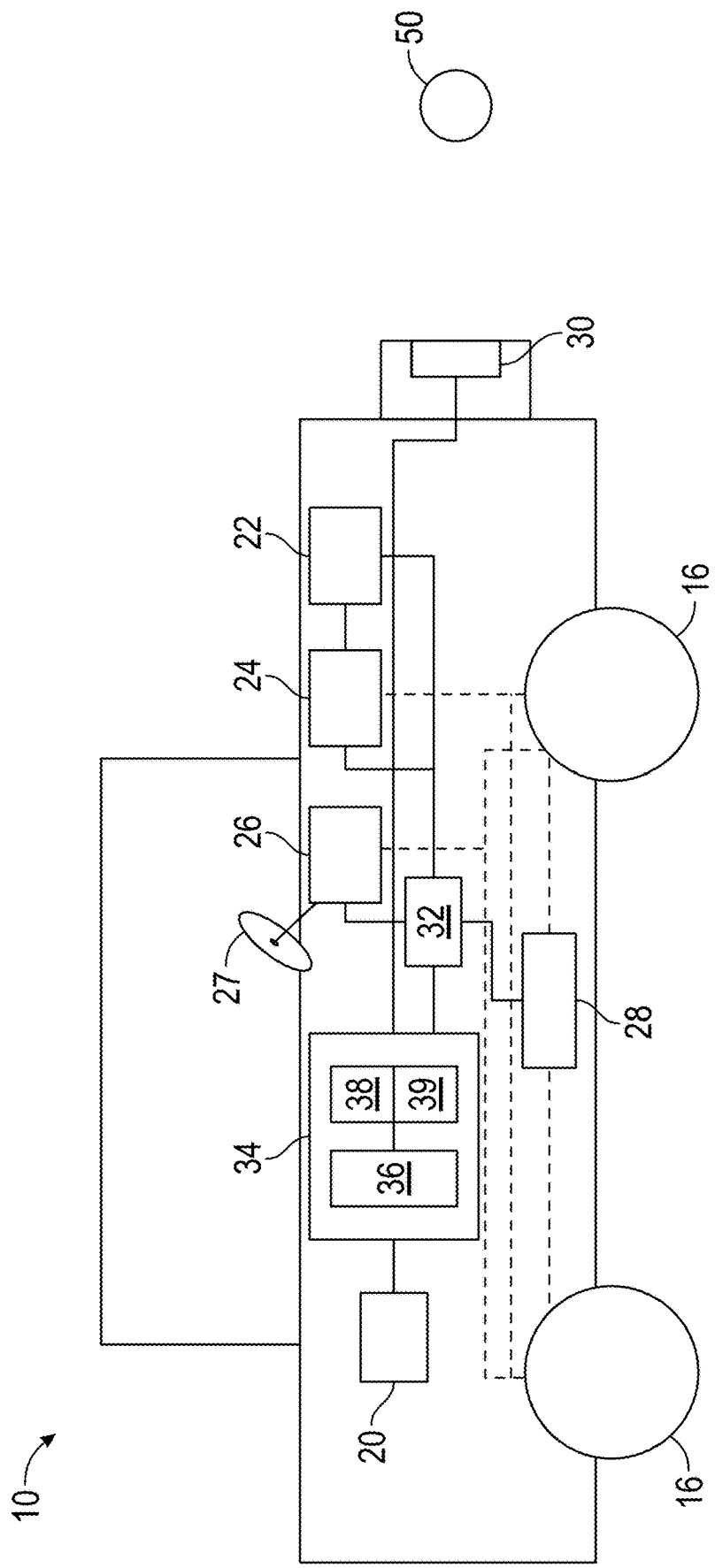
FIG. 1 shows an autonomous vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows an autonomous vehicle 10. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. It is to be understood that the system and methods disclosed herein can also be used with an autonomous vehicle operating at any of Levels One through Five.

The autonomous vehicle 10 generally includes at least a navigation system 20, a propulsion system 22, a transmission system 24, a steering system 26, a brake system 28, a sensor system 30, an actuator system 32, and a controller 34. The navigation system 20 determines a road-level route plan for automated driving of the autonomous vehicle 10. The propulsion system 22 provides power for creating a motive force for the autonomous vehicle 10 and can, in various embodiments, include an internal combustion engine, an electric machine such as a traction motor, and/or a fuel cell propulsion system. The transmission system 24 is configured to transmit power from the propulsion system 22 to two or more wheels 16 of the autonomous vehicle 10 according to selectable speed ratios. The steering system 26 influences a position of the two or more wheels 16. While depicted as including a steering wheel 27 for illustrative purposes, in some embodiments contemplated within the scope of the present disclosure, the steering system 26 may not include a steering wheel 27. The brake system 28 is configured to provide braking torque to the two or more wheels 16.

The sensor system 30 includes a frequency modulated continuous wave (FMCW) system, in various embodiments. The FMCW system includes a Lidar system for generating a source signal and receiving a reflection of the source signal from an object or reflector 50 in the environment. The sensor system 30 measures the reflected signal to determine parameters such as a position and/or velocity of the reflector 50 with respect to the autonomous vehicle 10. The FMCW system can also be used to classify the reflector 50 using the methods discussed herein. The parameters and classification of the reflector 50 can be provided to the controller 34 for navigation of the autonomous vehicle 10.

The controller 34 builds a trajectory for the autonomous vehicle 10 based on the output of sensor system 30. The controller 34 can provide the trajectory to the actuator system 32 to control the propulsion system 22, transmission system 24, steering system 26, and/or brake system 28 in order to navigate the autonomous vehicle 10 with respect to the reflector 50.

The controller 34 includes a processor 36 and a computer readable storage device or storage medium 38. The computer readable storage medium includes programs or instructions 39 that, when executed by the processor 36, operate the autonomous vehicle based on sensor system outputs. The storage medium 38 may further include programs or instructions 39 that when executed by the processor 36, determines a state of a reflector 50 in order to allow the autonomous vehicle to drive with respect the reflector. The processor 36 can be used to process signals from the FMCW system in order to determine range, Doppler measurements and to characterize the reflector 50 based on polarization states of the reflected signal.

Figure 2:
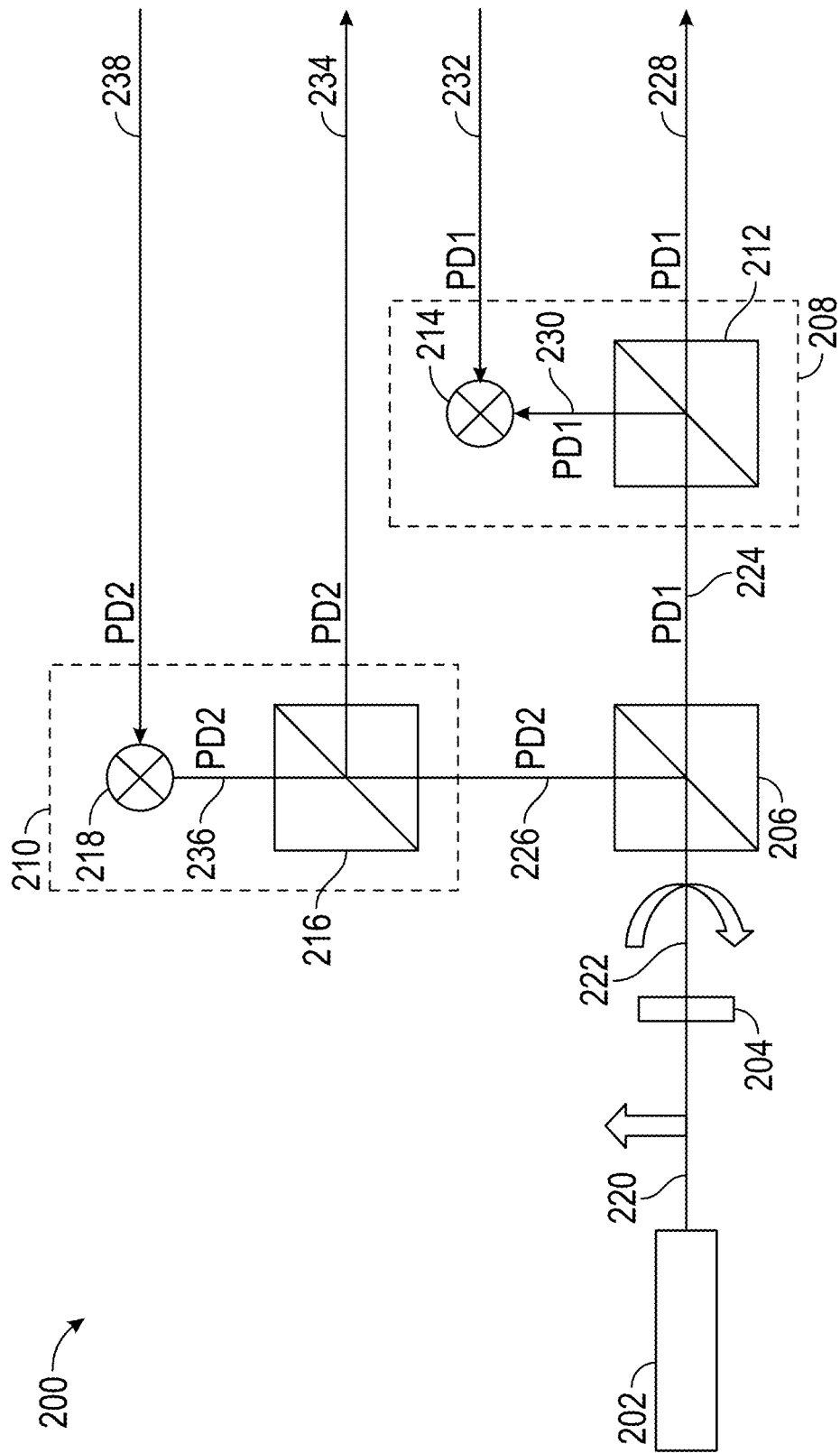
FIG. 2 shows a schematic diagram illustrating an optical architecture of a frequency modulated continuous wave sensor system, in an embodiment.

FIG. 2 shows a schematic diagram illustrating an optical architecture of the FMCW system 200, in an embodiment. The FMCW system 200 includes a light source 202 such as a laser, a phase plate 204, a polarizing beam splitter 206, a first detector 208 and a second detector 210. The light source 202 generates a light beam 220 that is in a linearly polarized state. In an embodiment, the light source 202 can be modulated to generate the light beam 220 in the form of a chirp signal. The light beam 220 passes through the phase plate 204 which converts the light beam 220 into an elliptically polarized light beam 222. In various embodiments, the elliptically polarized state can be a circularly polarized state.

The phase plate 204 can be electronically controlled in order to control or adjust the ellipticity of the elliptically polarized light beam 222. The elliptically polarized light beam 222 enters the polarizing beam splitter 206 which separates the elliptically polarized light beam 222 into a first linearly polarized light beam 224 and a second linearly polarized light beam 226. The first linearly polarized light beam 224 is in a first linear polarized state along a first polarization direction (PD1) and the second linearly polarized light beam 226 is in a second linear polarized state along a second polarization direction (PD2). In various embodiments, the first polarization direction (PD1) is perpendicular to the second polarization direction (PD2). In various embodiments, the first linearly polarized light beam 224 is p-polarized and the second linearly polarized light beam 226 is s-polarized. Alternatively, the first linearly polarized light beam 224 is s-polarized and the second linearly polarized light beam 226 is p-polarized. One skilled in the art will recognize that controlling the ellipticity of the elliptically polarized light beam 222 controls a relative ratio of an intensity of the first linearly polarized light beam 224 to the intensity of the second linearly polarized light beam 226. The first linearly polarized light beam 224 is sent to the first detector 208 and the second linearly polarized light beam 226 is sent to the second detector 210.

The first detector 208 includes a first beam splitter 212 and a first optical mixer 214. The first beam splitter 212 separates the first linearly polarized light beam 224 into a first source signal 228 and a first reference beam 230. The splitting ratio of the first beam splitter 212 is such that the first source signal 228 receives a majority of the first linearly polarized light beam 224, with the intensity of the first reference beam 230 being a small fraction of the intensity of the first linearly polarized light beam 224. The first source signal 228 is transmitted into the environment while the first reference beam 230 is sent directly to the first optical mixer 214. The first source signal 228 is reflected from the reflector 50, FIG. 1, to produce a first reflected signal 232. The first reflected signal 232 is mixed with the first reference beam 230 at the first optical mixer 214 to form a first interference signal. The first interference signal can be sent to a processor, such as processor 36, in order to determine a range and/or velocity of the reflector 50.

The second detector 210 includes a second beam splitter 216 and a second optical mixer 218. The second beam splitter 216 separates the second linearly polarized light beam 226 into a second source signal 234 and a second reference beam 236. The splitting ratio of the second beam splitter 216 is such that the second source signal 234 receives a majority of the second linearly polarized light beam 226, with the intensity of the second reference beam 236 being a small fraction of the intensity of the second linearly polarized light beam 226. The second source signal 234 is transmitted into the environment while the second reference beam 236 is sent to the second optical mixer 218. The second source signal 234 is reflected from the object 50 to produce a second reflected signal 238. The second reflected signal 238 is mixed with the second reference beam 236 at the second optical mixer 218 to form a second interference signal. The second interference signal can be sent to a processor, such as processor 36, in order to determine a range and/or velocity of the object.

The first detector 208 transmits the first source signal 228 polarized along the first polarization direction (PD1) and is configured to be receptive to signals received along the first polarization direction. Similarly, the second detector 210 transmits the second source signal 234 polarized along the second polarization direction (PD2) and is configured to be receptive to signals received along the second polarization direction.

A first reflection intensity of the first reflected signal and a second reflection intensity of the second reflected signal can be compared to each other in order to classify the object. For example, an object made of metal can reflect s-polarized light and p-polarized with reflections that are not equal in intensity. For example, at a given angle, a reflection is detected for one polarization state while no reflection is detected for other polarization states, as is given by Fresnel reflection coefficients. On the other hand, human skin may be moderately reflective along both polarization directions. These intensities along different polarization direction can be recorded and used to classify the object, such as whether the object is human or a metallic object, for example.

For a first source signal 228 and a second source signal 234 drawn from an elliptically polarized light beam 222, the intensity of the first source signal 228 is different from the intensity of the second source signal 234. A first ratio or transmission ratio is calculated that compares the intensity of the first source signal 228 to the intensity of the second source signal 234. In an embodiment in which the first source signal 228 is a P-polarized source signal and the second source signal 234 is an S-polarized source signal, the transmission ratio is shown in Eq. (1):

$$R_0 = \frac{I(P \text{ source signal})}{I(S \text{ source signal})} \qquad \text{Eq. (1)}$$

A second ratio or polarization signal ratio is calculated comparing the first reflection intensity of the first reflected signal 232 (P-polarized reflected signal) and the second reflection intensity of the second reflected signal 238 (S-polarized reflected signal), as shown in Eq. (2):

$$R_d = \frac{I(P \text{ reflected signal})}{I(S \text{ reflected signal})} \qquad \text{Eq. (2)}$$

When a reflector 50 is equally reflective along the P-polarization direction and the S-polarization direction, the first ratio $R_0$ and the second ratio $R_d$ are equal to each other and a difference between them is equal to zero ($R_0-R_d=0$). When the reflector 50 is more reflective along the P-polarization direction than along the S-polarization direction, the difference is less than zero ($R_0-R_d<0$). When the reflector 50 is less reflective along the P-polarization direction than the S-polarization direction, the difference is greater than zero ($R_0-R_d>0$). Thus, the difference between ratios can be used to determine a preferred direction of polarization of the reflected signal as a polarization angle. Such determination can be used to classify the reflector 50. These relations remain true in the special case in which the elliptically polarized light beam 222 is circularly polarized, or in linear polarization. The difference in the reflection coefficients give a measure of the diattenuation of the reflective object.

In one embodiment, an operator can adjust a ratio of the first source signal and the second source signal using the phase plate 204 in order to selectively observe a reflector. For example, the second source signal 234 can be removed or an intensity of the second source signal can be reduced in order to observe all reflectors except those that reflect along the direction of polarization of the second source signal.

Figure 3:
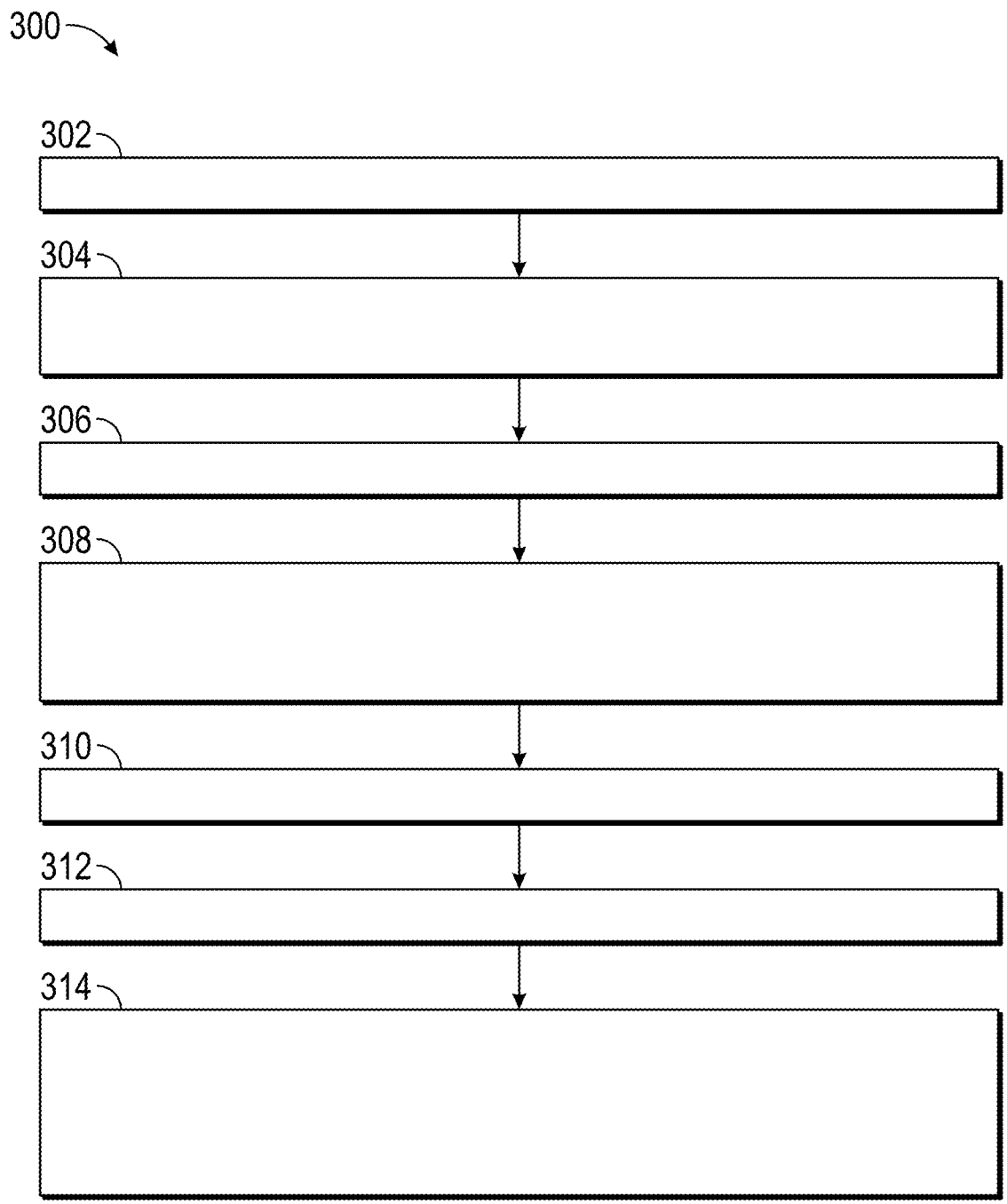
FIG. 3 shows a flowchart illustrating a method for classifying an object using the methods disclosed herein.

FIG. 3 shows a flowchart 300 illustrating a method for classifying an object using the methods disclosed herein. In box 302, an initial polarization ratio is selected for the elliptically polarized light beam 222, FIG. 2, using a control voltage applied to the phase plate 204. The initial polarization ratio controls an ellipticity of the elliptically polarized light beam 222. In box 304, a transmission ratio between the intensity of the first source signal $I(S_0)$ and the intensity of the second source signal $I(P_0)$ is measured or established, the ratio being $R_0=I(S_0)/I(P_0)$. In box 306, the beam is split into two linear states (i.e., into the P-polarized beam of the first source signal and a S-polarized beam for the second source signal). In box 308, each of the two linear states is further divided into a small portioned reference beam which is preserved in a local oscillator state and a source signal which is projected into the environment. In box 310, reflected signals (resulting from reflection of the source signals) are combined with associated reference beams. In box 312, range and Doppler signals are determined for each of the linear states. In box 314, the polarization signal ratio $R_d=I(S_d)/I(P_d)$ of the intensities of the reflected signals is measured. A difference between the ratios ($R_0-R_d$) is determined to identify diattenuation effects or reflected intensity differences along the relative polarization directions. The changes in relative intensity along the P-polarization direction and the S-polarization direction is used to identify the material of the reflector and polarization sensitivity of the reflector.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:
1. A method of classifying an object, comprising:
    transmitting a first source signal having a first polarization direction and a second source signal having a second polarization direction at the object;
    receiving a first reflected signal generated at the object in response to the first source signal;

receiving a second reflected signal generated at the object in response to the second source signal;

classifying the object by comparing the first reflected signal to the second reflected signal; and adjusting a ratio of the first source signal to the second source signal to select the object for observation based on its classification.

2. The method of claim 1, further comprising classifying the object by comparing a second reflection intensity of the second reflected signal to a first reflection intensity of the first reflected signal.

3. The method of claim 1, further comprising generating the first source signal and the second source signal from an elliptically polarized light beam.

4. The method of claim 3, wherein the elliptically polarized light beam is a circularly polarized light beam.

5. The method of claim 1, further comprising:

determining a transmission ratio of the first source signal to the second source signal;

determining a polarization signal ratio of the first reflected signal to the second reflected signal; and classifying the object based on a difference between the transmission ratio and the polarization signal ratio.

6. The method of claim 1 wherein the first polarization direction is a P-polarization direction and the second polarization direction is an S-polarization direction.

7. The method of claim 1, further comprising generating the first source signal and the second source signal splitting a Frequency Modulated Continuous Wave signal at a beam splitter.

8. A system for classifying an object, comprising:

a polarizing beam splitter for generating a first source signal having a first polarization direction and a second source signal having a second polarization direction;

a first detector for transmitting the first source signal at the object and receiving a first reflected signal generated at the object in response to the first source signal;

a second detector for transmitting the second source signal at the object and receiving a second reflected signal generated at the object in response to the second source signal; and a processor configured to compare the first reflected signal to the second reflected signal to classify the object and adjust a ratio of the first source signal to the second source signal to select the object for observation based on its classification.

9. The system of claim 8, wherein the processor is further configured to classify the object by comparing a second reflection intensity of the second reflected signal to a first reflection intensity of the first reflected signal.

10. The system of claim 8, wherein the polarizing beam splitter generates the first source signal and the second source signal from an elliptically polarized light beam.

11. The system of claim 10, wherein the elliptically polarized light beam is a circularly polarized light beam.

12. The system of claim 8, wherein the processor is further configured to:

determine a transmission ratio of the first source signal to the second source signal;

determine a polarization signal ratio of the first reflected signal to the second reflected signal; and classify the object based on a difference between the transmission ratio and the polarization signal ratio.

13. The system of claim 8 wherein the first polarization direction is a P-polarization direction and the second polarization direction is an S-polarization direction.

14. The system of claim 8, wherein the polarizing beam splitter splits a Frequency Modulated Continuous Wave signal into the first source signal and the second source signal.

15. A vehicle, comprising:

a polarizing beam splitter for generating a first source signal having a first polarization direction and a second source signal having a second polarization direction;

a first detector for transmitting the first source signal at an object and receiving a first reflected signal from the object in response to the first source signal;

a second detector for transmitting the second source signal at the object and receiving a second reflected signal from the object in response to the second source signal; and a processor configured to compare the first reflected signal to the second reflected signal to classify the object and adjust a ratio of the first source signal to the second source signal to select the object for observation based on its classification.

16. The vehicle of claim 15, wherein the processor is further configured to classify the object by comparing a second reflection intensity of the second reflected signal to a first reflection intensity of the first reflected signal.

17. The vehicle of claim 15, wherein the polarizing beam splitter generates the first source signal and the second source signal from an elliptically polarized light beam.

18. The vehicle of claim 15, wherein the processor is further configured to:

determine a transmission ratio of the first source signal to the second source signal;

determine a polarization signal ratio of the first reflected signal to the second reflected signal; and classify the object based on a difference between the transmission ratio and the polarization signal ratio.

19. The vehicle of claim 15, wherein the first polarization direction is a P-polarization direction and the second polarization direction is an S-polarization direction.

20. The vehicle of claim 15, wherein the polarizing beam splitter splits a Frequency Modulated Continuous Wave signal into the first source signal and the second source signal.

\* \* \* \* \*